United States Patent
Suzuki et al.

(10) Patent No.: US 6,543,711 B2
(45) Date of Patent: Apr. 8, 2003

(54) DAMPER CONTINUOUS FEEDING BODY

(75) Inventors: Nobuharu Suzuki, Osaka (JP); Hiroyuki Iida, Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 09/828,128

(22) Filed: Apr. 9, 2001

(65) Prior Publication Data

US 2001/0027929 A1 Oct. 11, 2001

(30) Foreign Application Priority Data

Apr. 10, 2000 (JP) ........................................ 2000-108141

(51) Int. Cl.[7] ........................... B65H 18/28; B65H 75/14
(52) U.S. Cl. ................ 242/160.4; 242/609.4; 242/610.4; 242/918; 206/713
(58) Field of Search ................. 242/160.4, 609.4, 242/610.4, 918; 206/714, 717, 713, 715, 716

(56) References Cited

U.S. PATENT DOCUMENTS

| | | | | |
|---|---|---|---|---|
| 3,390,762 A | * | 7/1968 | Mernieks ................. | 242/160.4 |
| 3,785,483 A | * | 1/1974 | Sillay ..................... | 242/160.4 |
| 4,440,355 A | * | 4/1984 | Mori et al. ............... | 242/918 |
| 4,657,137 A | * | 4/1987 | Johnson .................. | 206/714 |
| 4,702,788 A | * | 10/1987 | Okui ...................... | 206/714 |
| 4,893,764 A | * | 1/1990 | Juntunen ................. | 242/610.4 |
| 4,957,816 A | * | 9/1990 | Adkins | |
| 5,494,168 A | * | 2/1996 | Hart ...................... | 206/714 |
| 5,731,117 A | * | 3/1998 | Ferrar et al. | |
| 5,827,584 A | * | 10/1998 | Adao et al. | |
| 5,846,621 A | * | 12/1998 | Nagamatsu | |
| 5,908,173 A | * | 6/1999 | De Roeck ............... | 242/609.4 |
| 5,962,098 A | * | 10/1999 | Munninger et al. | |
| 6,202,853 B1 | * | 3/2001 | Bianca et al. ............ | 206/713 |
| 2002/0022131 A1 | * | 2/2002 | Nakano et al. | |

FOREIGN PATENT DOCUMENTS

| | | | | |
|---|---|---|---|---|
| JP | 59-180855 | | 10/1984 | |
| JP | 5-132658 | | 5/1993 | |
| JP | 6-156879 | * | 6/1994 | ............. 242/160.4 |
| JP | 10-249865 | | 9/1998 | |

* cited by examiner

Primary Examiner—John M. Jillions
(74) Attorney, Agent, or Firm—McGinn & Gibb, PLLC

(57) ABSTRACT

A damper continuous feeding body having a plurality of punched out dampers, each of which is constituted by a viscoelastic body and a restraint body which are laminated on each other, wherein surfaces of the viscoelastic bodies are pasted on a release surface of a continuous liner so that the plurality of dampers are arranged at a predetermined pitch. The damper continuous feeding body allows dampers to be pasted by an automatic machine so as to improve the accuracy of the pasted positions of the dampers and to enhance the efficiency in pasting, and further whereby the dampers can be prevented from being exposed to contamination.

22 Claims, 3 Drawing Sheets

DAMPER CONTINUOUS FEEDING BODY

BACKGROUND OF THE INVENTION

1. Field of the Invention

The present invention relates to a continuous feeding body of dampers for use in suspensions for supporting electric/electronic parts, particularly magnetic heads for magnetic recording media, optical pickups for optical recording media, etc.

The present application is based on Japanese Patent Application No. 2000-108141, which is incorporated herein by reference.

2. Description of the Related Art

A magnetic head inside a hard disk drive unit floats above a magnetic disk while keeping a very small gap by use of the balance between the wind pressure generated by the revolution of the magnetic disk and the spring elasticity of a suspension for supporting the magnetic head. In recent years, such a hard disk drive has been made higher in recording density and higher in speed. The gap between the magnetic head and the magnetic disk has been narrower to increase the recording density. In addition, the rotation speed of the magnetic disk has been larger to respond to the higher speed of the hard disk drive. Vibration is generated in the suspension due to wind turbulence caused by the revolution of the magnet disk so that the positioning accuracy of the magnetic head attached to a top end portion of the suspension is lowered conspicuously. Recently, such a tendency has made the problem of vibration more serious.

On the other hand, also in an optical disk drive, in accordance with higher recording density and higher disk rotation speed, there has been considered a method in which a suspension is used in place of a conventional gimbal spring to support an optical pickup, in the same manner as the suspension of the hard disk drive unit. Thus, the problem of vibration has been produced in the same manner.

As one of methods for suppressing the vibration of a suspension, there is a method in which a damper constituted by a vibration damping material layer (viscoelastic body) and a restraint member (restraint body) in contact with the vibration damping material layer is provided on the suspension, as disclosed in Japanese Patent Publication No. JP-A-59-180855. FIG. 9 shows a state where such a damper 3 is pasted on a suspension 22 of a magnetic head 21. Incidentally, the reference numeral 23 represents an attachment block for fixing the suspension 22.

For example, a viscoelastic body as disclosed in Japanese Patent Publication No. JP-A-5-132658 is used for the vibration damping material layer. On the other hand, it has been known that a polyimide film disclosed in Japanese Patent Publication No. JP-A-10-249865 or other plastic films such as a polyester film, etc. as well as metal foil of stainless steel or the like may be used for the restraint body.

In such a damper constituted by a restraint body and a viscoelastic body, the viscoelastic body fixed by a coated substrate of a suspension or the like and the restraint body produces shear deformation when vibration is generated. By using that heat is generated by this deformation, the damper transduces vibration energy to heat energy so as to suppress the vibration.

Such a damper is provided in a form that a laminated body on which the restraint body and the viscoelastic body are pasted is punched out by a die. Since the viscoelastic body usually has tackiness itself, the viscoelastic body is supplied in a condition that the opposite surface to the surface where the restraint body has been laminated is pasted to a liner subjected to release treatment. Then, the damper is usually separated from the liner for use at the time the damper is pasted on a part serving as a suspension or the like.

Such a damper is usually pasted manually on a suspension or the like. In this manner, however, it is difficult to paste the damper accurately on predetermined position, and position deviation often takes place. If the position on which the damper is pasted is deviated, there arises a problem that an expected vibration damping property cannot be obtained.

In addtion, when the damper is manually pasted, the time to paste one damper is so long that many workers have to be cast for mass production. Further if the damper is manually pasted, the damper of the suspension or the like is exposed to contamination generated from human bodies. That is very inconvenient particularly if the damper or the suspension or the like is used for applications such as a hard disk where breakdown may be occurred by contamination.

SUMMARY OF THE INVENTION

Taking the foregoing problems into consideration, it is an object of the present invention to provide a damper continuous feeding body which allows dampers to be pasted by an automatic machine so as to improve the accuracy in pasted Position of the dampers and enhance the efficiency in pasting, and further whereby the dampers can be prevented from being exposed to contamination.

The aforementioned object can be attained by the present invention as follows.

That is, according to the present invention, there is provided a damper continuous feeding body, comprising a plurality of punched out dampers, each of which is constituted by a viscoelastic body and a restraint body which are laminated on each other, wherein surfaces of the viscoelastic bodies are pasted on a release surface of a continuous liner so that the plurality of dampers are arranged at a predetermined pitch.

In the above damper continuous feeding body, preferably, the pitch with which the dampers are arranged is substantially equal to a pitch with which the dampers are punched.

Preferably, portions of the liner on which the dampers are pasted are punched into the same shape as that of the dampers while a backing tape is pasted on portions surrounding the punched portions so as to hold the punched portions.

More preferably, the liner is wound on a reel, and more preferably, a plastic film is rolled in as an interleaf when the liner is wound on the reel.

Preferably, the reel is subjected to antistatic treatment so that surface resistivity thereof is not higher than $10^{11}$ Ω/□. Preferably, a foam layer is formed on an outer circumferential side of a core portion of the reel.

According to the present invention, a plurality of dampers are arranged at a predetermined pitch on a release surface of a continuous liner in the condition that the dampers have been formed by punching. Thus, the dampers can be pasted by an automatic machine. Then, since the surface of a viscoelastic body is pasted, pasting can be performed by use of the tackiness of the viscoelastic body. In addition, the exposed portion of the viscoelastic body is reduced so that contamination can be reduced. As a result, the pasted position accuracy of the dampers can be improved by the automatic machine, and the pasting can be performed efficiently. Further, it Is possible to prevent the dampers from being exposed to contamination.

In addition, if the pitch with which the dampers are arranged is substantially equal to the pitch at which the dampers have been punched, the dampers can be arranged at a predetermined pitch by use of the punching pitch as it is. Thus, it is possible to omit a troublesome process in which the dampers are rearranged after they are punched.

When the portions of the liner where the dampers have been pasted are punched in the same shape as the dampers and held by a backing tape pasted on portions surrounding the punched portions, the dampers can be punched together with the liner. Accordingly, the punching process becomes easy. In addition, the liner used for the punching can be used as it is, and further the arrangement of the dampers when they are punched can be utilized as it is, as described above. In addition, because the dampers are held by the backing tape pasted thus, the dampers are hardly left out, and can be separated from the liner easily.

If the liner is wound on a reel, an elongated liner on which the dampers are pasted can be continuously supplied from the reel. It is therefore possible to enhance the workability in the automatic machine.

If the liner on which the dampers are pasted is rolled in as it is, when a plastic film is rolled in as an interleaf the dampers will be apt to deviate in position due to the winding-tightening force. On the contrary, if a plastic film is rolled in together as an interleaf, a slip property can be obtained between the dampers and the interleaf of the plastic film. Thus, the dampers can be preferably from positional deviation.

If the reel is subjected to antistatic treatment so that the surface resistivity thereof becomes not higher than $10^{11}$ $\Omega/\square$, release electrification generated between the reel and the liner when the liner is drawn out can be suppressed. Thus, dust or foreign matters in the air can be effectively prevented from adhering to the liner. In addition, head crush in an MR head or the like can be made difficult to occur.

If a foam layer is formed on the outer circumferential side of a core portion of the reel, the winding-tightening force particularly on the inner circumferential side where the winding-tightening force increases can be relieved by the compression deformation of the foam layer. Thus, the dampers can be effectively prevented from positional deviation on the outer circumferential side.

BRIEF DESCRIPTION OF THE DRAWINGS

FIG. 1A is a front view and FIG. 1B is a side view;

FIG. 2A is a front view and FIG. 2B is a side view;

FIG. 3A is a side view and FIG. 3B is a plan view;

FIG. 5A is a front view and FIG. 5B is a side view;

FIG. 6A is a front view and FIG. 6B is a side view;

FIG. 7A is a transverse sectional view and FIG. 7B is a side view;

FIG. 8A is a side view and FIG. 8B is a plan view.

DETAIL DESCRIPTION OF THE PREFERRED EMBODIMENTS

Embodiments of the present invention will be described below with reference to the drawings, sequentially about the summary of shape and structure, the material and method, and so on.

Figure 1A:
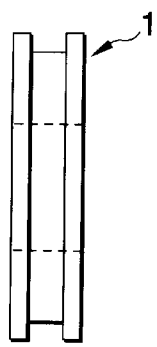
FIGS. 1A and 1B are views showing a damper continuous feeding body according to a first embodiment.
Figure 1B:
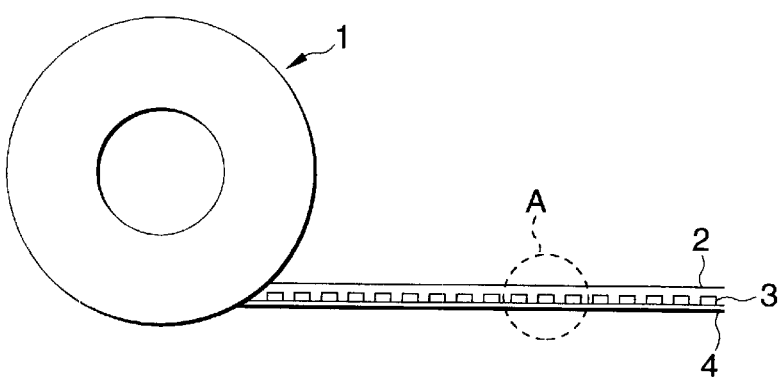
Figure 2A:
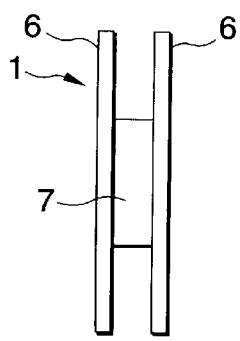
FIGS. 2A and 2B are views showing a reel according to the first embodiment.
Figure 2B:
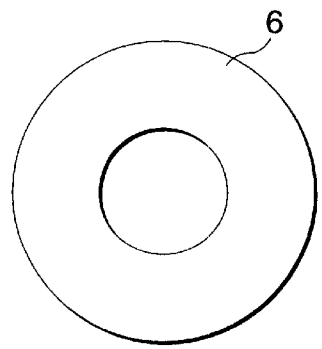

FIGS. 1A and 1B, FIGS. 2A and 2B, FIGS. 3A and 3B, and FIG. 4 show a first embodiment of the present invention. In a damper continuous feeding body according to the present invention, as shown FIGS. 1A and 1B, a plurality of dampers 3 formed by punching are arranged at a constant pitch so that the dampers 3 are pasted on a release surface of a continuous liner 4. In the illustrated embodiment, the liner 4 is wound on a reel 1 while a plastic film is rolled in as an interleaf 2. The reel 1 is constituted by two flanges 6 and a core portion 7 as shown in FIG. 2A. Each of the flanges 6 is fixed to the core portion 7 at several places by staples. One end of the liner 4 is fixed to the core portion 7 by an adhesive tape.

Figure 3A:
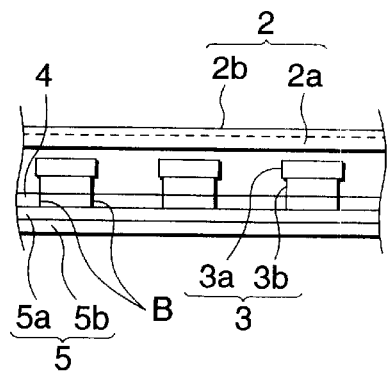
FIGS. 3A and 3B are enlarged views of a portion A in FIG. 1A.
Figure 3B:
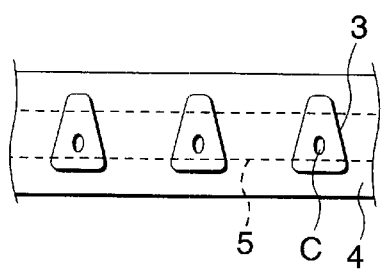

FIGS. 3A and 3B are enlarged views of a portion A in FIG. 1B. As shown in FIG. 3A, each of the dampers 3 includes a structure in which a viscoelastic body 3b and a restraint body 3a are laminated. The surface of the viscoelastic body 3b is pasted on the release surface of the liner 4. On the other hand, the interleaf 2 is subjected to antistatic treatment on one side of a plastic base 2a so that an antistatic treated surface 2b is disposed in opposition to the dampers 3 so as not to abut against the dampers 3 directly. Each of the dampers 3 is punched so that the viscoelastic body 3b becomes smaller than the restraint body 3a made of stainless steel foil. Therefore, the dampers 3 are punched on a full-cut line B while they are pasted on the liner 4. In order that the portions of the full-cut liner 4 where the dampers 3 have been pasted are fixed to their surrounding portions, a backing tape 5 (which may include one or a plurality of portions 5a, 5b) is pasted on the surface opposite to the surface where the dampers 3 have been pasted. The backing tape 5 is narrower in width than the liner 4 so as not to project from the liner 4 due to the positional deviation when the backing tape 5 is pasted. Further, the backing tape 5 is ensured to have a width necessary and sufficient to prevent the full-cut liner 4 from peeling off.

Figure 4:
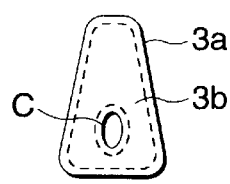
FIG. 4 is an enlarged plan view of a damper according to the first embodiment.

In addition, in each of the dampers 3, as shown in FIG. 4, the restraint body 3a and the viscoelastic body 3b are partially cut off as a cut-off portion C. Although such cut-off portions C are not always required, they are provided correspondingly to hole portions of a suspension or portions to fix wiring.

FIGS. 5A and 5B, FIGS. 6A and 6B, FIGS. 7A and 7B and FIGS. 8A and 8B show a second embodiment of the present invention. A reel 8 is constituted by two flanges 13 of foam bodies, a core portion 14, and a foam body layer 15 formed on the outside of the core portion 14 for preventing winding from being tightened. The core portion 14 is constituted by a lamination in which foam bodies 14a to 14f each punched like a ring are laminated by a bonding agent.

Figure 5A:
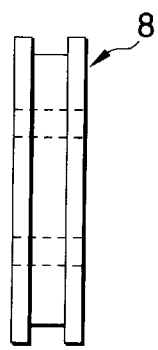
FIGS. 5A and 5B are views showing a damper continuous feeding body according to a second embodiment.
Figure 5B:
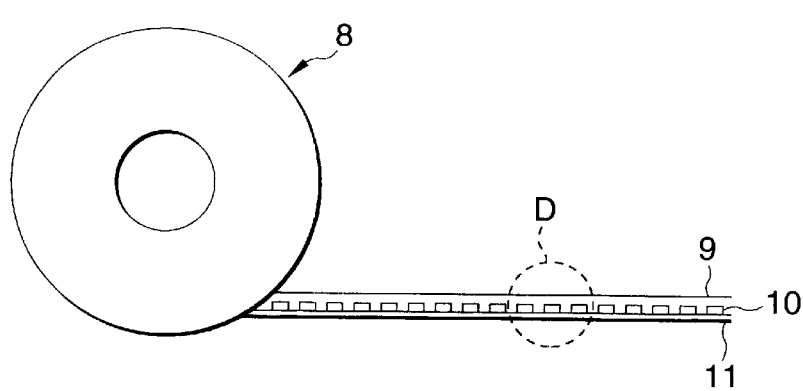
Figure 6A:
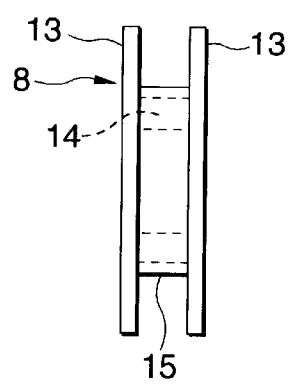
FIGS. 6A and 6B are views showing a reel according to the second embodiment.
Figure 6B:
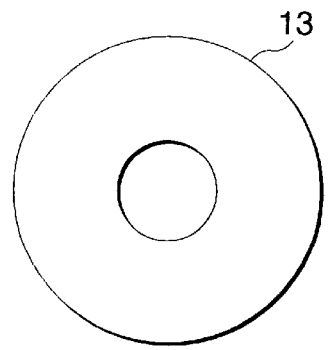
Figure 7A:
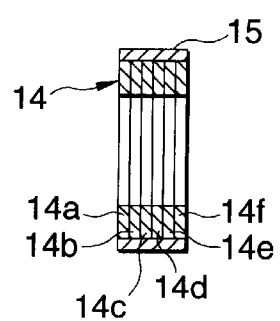
FIGS. 7A and 7B are views showing a core portion of the reel according to the second embodiment.
Figure 7B:
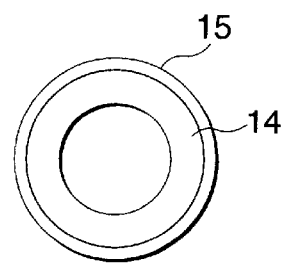
Figure 8A:
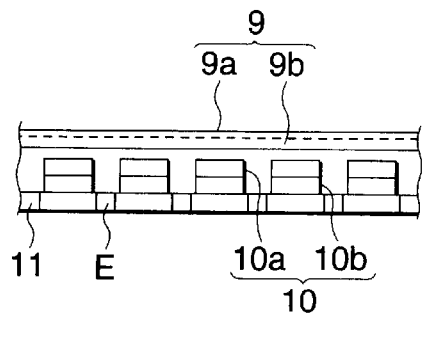
FIGS. 8A and 8B are enlarged views of a portion D in FIG. 5A.
Figure 8B:
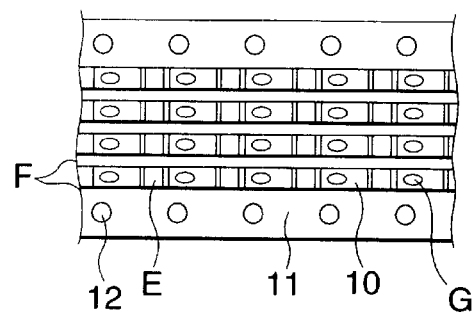
Figure 9:
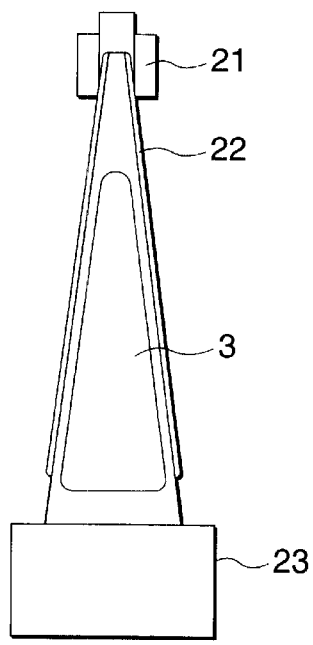
FIG. 9 is a plan view showing an in-service state of a damper pasted on a suspension of a magnetic head.

FIGS. 8A and 8B are enlarged views of a portion D in FIG. 5B. In the same manner as in the first embodiment, interleaf 9 is made of a plastic base 9a one surface of which has been subjected to antistatic treatment so that an antistatic treated surface 9b is disposed in opposition to the dampers 10 so as not to abut against the dampers 10 directly. A restraint body 10a of each of the dampers 10 is made of polyimide film. Portions F are punched like a ribbon from a laminate sheet of the polyimide film, a viscoelastic body 10b and a liner 11 by a rotary die. After tailing is removed, cut-off portions E and G are punched off by a high-speed press. Thus, the damper continuous feeding body can be manufactured. Further, sprocket holes 12 are provided corresponding to the automatic machine.

Description will be made below about a material and a manufacturing method of the damper continuous feeding body according to the present invention, and so on.

Any viscoelastic body may be used so long as it has a vibration damping property for temperatures and vibration frequencies of portions to which the dampers are applied. Specifically, there is often used a viscoelastic body in which additives such as a crosslinker, an oxidation inhibitor, etc. are added to or reacted with copolymer of two or more kinds of acrylic acid and acrylic ester monomers in accordance with necessity. The vibration damping property is usually controlled by the kinds and loadings of the monomers. Although viscoelastic bodies having tackiness themselves are generally used, a heat-sensitLive adhesive type which exhibits tackiness in response to heat added thereto may be also used. Alternatively, an adhesive layer may be laminated if the viscoelastic body has no tackiness or is short of adhesive power.

Since the viscoelastic body typically has tackiness itself, it is supplied in the condition that liners are pasted on its both sides. Alternatively, the viscoelastic body may be applied at its one surface to the restraint body directly and pasted with a liner on the other surface, or may be laminated with the restraint body after being applied to a liner directly. In such cases, the step of laminating the viscoelastic body and the restraint body is omitted.

Any restraint body may be used so long as it can restrain the deformation of the viscoelastic body. Examples of such restraint bodies include: metal foil of stainless steel, aluminum, or the like; plastic film of polyimide, polyethylene terephthalate, polyethylene naphthalate, aramid, or the like; and so on.

A laminator is usually used for laminating the viscoelastic body and the restraint body. Laminating conditions may be selected suitably in accordance with the adhesive property of the viscoelastic body, the material of the restraInt body, and so on. For example, the laminator is used in the conditions that the pressure is in a range of from 20 to 490 kPa, he temperature is in a range of from room temperature to 130° C., and the speed is in a range of from 0.1 to 5 m/min. On the other hand, as the laminating method, there are: a method in which the vlscoelastic body and the restraint body are punched after they are laminated; and a method in which the viscoelastic body and the restraint body are positioned and laminated after they are punched respectively.

Although the viscoelastic body and the restraint body are typically laminated as two layers, a large number of layers may be laminated alternately or the viscoelastic body and the restraint body may be formed into a plurality of layers respectively. When two laminated layers of the viscoelastic body and the restraint body are used as a damper for a suspension, it is preferable that the thickness of the viscoelastic body is in a range of from 15 to 250 µm and the thickness of the restraint body is in a range of from 15 to 100 µm.

As the liner, there may be used a liner in which at least one side of a plastic film of polyester or the like has been subjected to release treatment, or a liner in which a material having releasability itself such as polyethylene or polypropylene has been made into a film. A dimethyl siloxane agent is typically used for the release treatment. For application to a hard disk drive or the like, however, organic silicon may be volatilized and condensed on a disk. Thus, the condensed organic silicon may cause crush of a head and the disk the head and the disk are in contacting each other. In such a case, a non-silicon treatment agent may be used. Examples of such non-silicon treatment agents include: long-chain alkyl agents; fluoroacrylate or polyether fluoride agents; etc.

From the point of view of flexibility in winding on the reel or transportability in the automatic machine, it is preferable that the liner in the present invention is a plastic film the thickness of which is in a range of from 30 to 110 µm.

The liner used for the application with the viscoelastic body may be used for a continuous feeding body as it is. Alternatively, the viscoelastic body may be repapered with another liner as a continuous feeding body on the way of the manufacturing process in accordance with requirement.

To punch the dampers, a high-speed press, a rotary die, or a Thomson die may be used for punching, or such punching means may be combined with each other.

When the dampers are punched, tailing may be finished by half-cutting without cutting off the liner, so as to form a continuous feeding body. However, in the case of high-speed press, it is preferable that unnecessary portions are removed by tailing-finishing after the liner as well as the dampers are full-cut. Although tailing may be peeled off manually after the step of punching, it is preferable that tailing-finishing is performed in line with the step of punching because tailing causes contamination.

Punched out by full-cutting, the punched dampers and the liner portions may be peeled off, or the liner may accompany the dampers to thereby prevent the dampers from being pasted on suspensions or the like when the dampers are separated and used by the automatic machine. It is therefore preferable that the backing tape is pasted on the back surface of the liner where the dampers are not provided, so as to reach the cut-off portions. It is preferable that the backing tape has adhesive strength enough to prevent the punched liner portions from being taken together with the dampers, and there appears no deviation after the backing tape is pasted on the liner. Specifically, it is desired that the adhesive strength (JIS C 2107) between the backing tape and the liner is at least twice, preferably at least Live times as high as the adhesive strength between the liner and the dampers. In addition, it is desired that the distance of deviation is not longer than 1 mm, preferably not longer than 0.3 mm, in retentivity (according to JIS Z0237, with a test plate of SUS304 (#280 polished), with a specimen of a bonded area 20 mm by 10 mm, and on the conditions of test temperature of 80±2° C., load of 500±50 g, and holding time of 1 hr).

The punched dampers are arranged at a constant pitch on the release-treated surface of the liner. Then, it is preferable that the pitch with which the dampers are arranged is substantially equal to the pitch with which they have been punched. In addition, in this case, it is preferable that sprocket holes are provided in the liner for positioning in an automatic machine. However, if the automatic machine detects the positions of the dampers directly with a sensor or the like, the sprocket holes can be omitted.

One line of the dampers may be punched from a raw roll of the dampers, or a plurality of lines thereof may be punched. Further, at the same time or immediately after a plurality of lines are punched, the lines may be slit to manufacture a plurality of dampers simultaneously.

To prevent contamination or adhesion of foreign matters, spewing of paste is not desired in the dampers. Such spewing can be prevented by making the viscoelastic body narrower than the restraint body. However, if the viscoelastic body is made too narrow, a predetermined vibrating damping property cannot be obtained. Accordingly, though depending on the thickness of the viscoelastic body, it is preferable that the viscoelastic body is narrowed in a range of from 0.01 to 0.5 mm, more preferably in a range of from 0.02 to 0.2 mm.

In the aforementioned case, although there is a method in which the restraint body and the viscoelastic body are laminated after being punched in different sizes respectively, the method disclosed in Japanese Patent Publication No. JP-A-10-249865 is preferred. That is, the method comprises the steps of: pressing and eliminating a part of a viscoelastic body of a composite material obtained by laminating or coating a restraint body with the viscoelastic body, by use of a viscoelastic body eliminating punch provided with a protrusion portion; and punching the composite material by a die-cutting punch and a die paired therewith, so that a portion of the composite material where there is no viscoelastic body forms an edge portion. Thus, this manufacturing method is preferred because the dampers can be obtained at a stroke of punching so that the process can be reduced, and there occurs no positional deviation which may be produced when the restraint body and the viscoelastic body are laminated.

The continuous liner where the dampers are arranged at a predetermined pitch typically reaches several to several tens of meters, though depending on the size and pitch of the dampers. Since it is not desired to transport and use the liner as it is, it is preferable to roll the liner by use of a reel.

Although a wide variety of materials such as paper, plastic, metal, etc. may be used as the material of the reel, plastic is preferred because it is light in weight and low in price, and there is no fear of paper dust which may be produced if paper is used. As the plastic reel, an integrally injection-molded reel may be used, or flanges and a core may be molded separately from each other and fixed to each other by a bonding agent, staples, or the like. Alternatively, plastic liner board or foam may be used. In such a case, for example, the reel may be manufactured by punching a flat plate by a Thomson die. The core portion may be manufactured, for example, by punching a flat plate into rings and laminating the rings by a bonding agent or the like.

When the liner is wound on the, reel, it is preferable that a plastic film is rolled in together as an interleaf. If the continuous liner mounted with the dampers at a constant pitch is rolled as it is, the dampers may be moved by winding-tightening force so as to cause positional deviation. If the interleaf is rolled in together, a slip property can be obtained between the plastic film and the dampers so that the dampers can be prevented from positional deviation. Although any material may be used for the plastic film if it has a slip property, for example, polyester, polyethylene, polypropylene, etc. are preferable. In addition, it is desired that the plastic film is of a material limited in transferring contamination because the plastic film comes in direct contact with the dampers when it is wound on the reel.

Plastic subjected to antistatic treatment may be used as the material of the reel. When the reel is used in the automatic machine, electrification due to release may be generated between he reel and the liner when the liner is drawn out. As a result, he electrification attracts dust n the air to allow foreign matters to adhere to the liner. In addition, if a plastic film is used as the restraint body, electrification remains also in the restraint body so as to cause head crush in an MR head or the like, which is weak in static electricity, when the damper is pasted on a suspension. Therefore, in order to prevent such electrification due to release, plastic subjected to antistatic treatment may be used as the material of the reel.

It is preferable that the reel is preferably subjected to antistatic treatment so that the surface resistivity thereof becomes not higher than $10^{11}$ $\Omega/\square$, especially not higher than a $10^3$ $\Omega/\square$. If the surface resistivity exceeds $10^{11}$ $\Omega/\square$, a valid antistatic effect cannot be obtained. For the antistatic treatment, an ordinarily commercially available material may be used as it is if it exhibits the aforementioned surface resistivity In the antistatic treatment, such a material may be incorporated into a reel material, or may be applied to the reel material.

When the liner is wound on the reel, winding-tightening is apt to occur to cause positional deviation of the dampers. Therefore, in order to prevent occurrence of winding-tightening, preferably, a foam layer is formed on the outside of the core portion of the reel, that is, on the portion abutting against the innermost winding of the liner. The foam layer is fixed to the outside of the core portion, for example, by a bonding agent or a double-sided adhesive tape. If the winding of the liner is tightened when the liner is wound or the reel, the foam layer exhibits a cushion property to have an effect of loosening the winding. A commercially available foam may be used as the foam layer if it exhibits a suitable cushion property. For example, urethane foam having a thickness in a range of from 0.5 to 10 mm, more preferably from 2 to 6 mm, is preferable. Further, the core portion may be formed of foam as a whole.

What is claimed is:

1. A damper continuous feeding body comprising:
   a continuous liner having a release-treated surface; and
   a plurality of dampers formed on said liner at a predetermined pitch, each damper in said plurality of dampers comprising:
      a viscoelastic body formed on said release treated surface; and
      a restraint body formed on said viscoelastic body,
   wherein said continuous liner comprises a plurality of punched portions which are respectively aligned with said plurality of dampers.

2. The damper continuous feeding body according to claim 1, wherein said predetermined pitch is substantially equal to a pitch at which said dampers are punched.

3. The damper continuous feeding body according to claim 1, further comprising:
   a backing tape pasted on a surface of said liner which is opposite said release treated surface,
   wherein portions of said continuous liner are punched to substantially the same shape as said damper and said backing tape is pasted on surrounding portions of said punched portions to thereby support said punched portions of said continuous liner.

4. The damper continuous feeding body according to claim 1, further comprising:
   a reel comprising a core portion,
   wherein said liner is wound around said core portion.

5. The damper continuous feeding body according to claim 4, further comprising:
   an interleaf located on said plurality of dampers so that when said liner is wound on said core portion, a positional deviation of said plurality of dampers is prevented.

6. The damper continuous feeding body according to claim 4, wherein said reel is subjected to antistatic treatment so that surface resistivity thereof is not higher than $10^{11}$ $\Omega/\square$.

7. The damper continuous feeding body according to claim 4, further comprising:

a foam layer provided on an outer circumferential surface of said core portion.

8. The damper continuous feeding body according to claim 5, wherein said interleaf is subjected to an antistatic treatment.

9. The damper continuous feeding body according to claim 1, wherein said plurality of dampers are punched so that said viscoelastic body becomes smaller than said restraint body.

10. The damper continuous feeding body according to claim 1, wherein said restraint body comprises one of stainless steel, aluminum, polyimide, polyethylene terephthalate, polyethylene naphthalate, and aramid.

11. The damper continuous feeding body according to claim 3, wherein said backing tape has a width narrower than that of said liner.

12. The damper continuous feeding body according to claim 1, wherein said viscoelastic body has a thickness in a range of about 15 to about 250 $\mu$m and said restraint body has a thickness in a range of about 15 to about 100 $\mu$m.

13. The damper continuous feeding body according to claim 1, wherein said continuous liner comprises one of polyethylene and polypropylene.

14. The damper continuous feeding body according to claim 1, wherein said continuous liner comprises a surface release-treated with dimethyl siloxane.

15. The damper continuous feeding body according to claim 1, wherein said continuous liner comprises a plastic film having a thickness in a range from about 30 to about 110 $\mu$m.

16. The damper continuous feeding body according to claim 3, wherein said backing tape has sufficient adhesive strength to prevent said punched portions from being peeled off together with a damper.

17. The damper continuous feeding body according to claim 7, wherein said foam layer prevents a winding-tightening of said continuous liner when said continuous liner is wound around said core portion of said reel.

18. The damper continuous feeding body according to claim 5, wherein said interleaf comprises one of polyester, polyethylene, and polypropylene.

19. The damper continuous feeding body according to claim 1, wherein said punched portions comprise removable punched portions.

20. The damper continuous feeding body according to claim 1, wherein said plurality of dampers are respectively disposed on said plurality of punched portions.

21. A damper feeding body, comprising:

a continuous liner having a release-treated surface and comprising a plurality of punched portions formed at a predetermined pitch;

a plurality of dampers formed on said continuous liner and respectively aligned with said plurality of punched portions, each damper comprising:

a viscoelastic body formed on said release treated surface; and a restraint body formed on said viscoelastic body; and a backing tape adhered to a surface of said liner which is opposite said release-treated surface, for supporting said plurality of punched portions of said continuous liner.

22. A damper feeding body, comprising:

a continuous liner having a release-treated surface and a plurality of punched portions;

a plurality of dampers formed on said release treated surface and respectively aligned with said plurality of punched portions, each damper in said plurality of dampers comprising a viscoelastic body and a restraint body; and a backing tape adhered to a surface of said liner opposite said release-treated surface.

* * * * *